United States Patent
Lee

(10) Patent No.: US 9,764,802 B2
(45) Date of Patent: Sep. 19, 2017

(54) FLOATING TYPE LNG STATION

(75) Inventor: Joong Nam Lee, Geoje-si (KR)

(73) Assignee: Samsung Heavy Ind. Co., Ltd. (KR)

( * ) Notice: Subject to any disclaimer, the term of this patent is extended or adjusted under 35 U.S.C. 154(b) by 443 days.

(21) Appl. No.: 13/580,897

(22) PCT Filed: Feb. 15, 2011

(86) PCT No.: PCT/KR2011/000985
§ 371 (c)(1),
(2), (4) Date: Aug. 23, 2012

(87) PCT Pub. No.: WO2011/105712
PCT Pub. Date: Sep. 1, 2011

(65) Prior Publication Data
US 2012/0317996 A1    Dec. 20, 2012

(30) Foreign Application Priority Data

Feb. 24, 2010   (KR) ........................ 10-2010-0016805
Dec. 2, 2010    (KR) ........................ 10-2010-0122104

(51) Int. Cl.
*B63B 27/34*   (2006.01)
*B63B 35/44*   (2006.01)
(Continued)

(52) U.S. Cl.
CPC .............. *B63B 27/34* (2013.01); *B63B 25/14* (2013.01); *B63B 27/30* (2013.01); *B63B 35/44* (2013.01);
(Continued)

(58) Field of Classification Search
CPC ........ F17C 1/002; F17C 3/025; F17C 13/082; F17C 2270/0102; F17C 2270/0105;
(Continued)

(56) References Cited

U.S. PATENT DOCUMENTS 3,857,245 A    12/1974   Jones
3,877,240 A     4/1975   Kniel et al.
(Continued)

FOREIGN PATENT DOCUMENTS

DE    1 959 367 A1     6/1971
DE    35 15 187 A1    10/1986
(Continued)

OTHER PUBLICATIONS

Sigtto, "ESD Arrangements & Linked Ship/Shore Systems for Liquefied Gas Carriers", 2009, published by Witherby Seamanship International Ltd.
(Continued)

*Primary Examiner* — Len Tran
*Assistant Examiner* — Gustavo Hincapie Serna
(74) *Attorney, Agent, or Firm* — Harness, Dickey & Pierce, P.L.C.

(57) ABSTRACT

A floating type LNG station floats on the sea and is used for refueling a ship or a marine structure using LNG. The floating LNG station comprises: a floating structure; an LNG tank which is prepared for storing LNG in the floating structure; an LNG line for discharging the LNG from the LNG tank to the ship or the marine structure; and an LNG pump which provides the LNG line with pumping force for discharging the LNG.

14 Claims, 6 Drawing Sheets

(51) Int. Cl.
*F17C 5/02* (2006.01)
*B63B 25/14* (2006.01)
*B63B 27/30* (2006.01)
B63J 99/00 (2009.01)

(52) U.S. Cl.
CPC ........ *F17C 5/02* (2013.01); *B63B 2035/4486* (2013.01); *B63J 2099/003* (2013.01); *F17C 2221/033* (2013.01); *F17C 2223/0161* (2013.01); *F17C 2223/033* (2013.01); *F17C 2227/0135* (2013.01); *F17C 2227/0157* (2013.01); *F17C 2227/0178* (2013.01); *F17C 2265/031* (2013.01); *F17C 2265/037* (2013.01); *F17C 2265/065* (2013.01); *F17C 2265/07* (2013.01); *F17C 2270/0105* (2013.01); *F17C 2270/0113* (2013.01); *Y02T 70/5263* (2013.01)

(58) Field of Classification Search
CPC ........ F17C 2270/011; F17C 2270/0113; F17C 2265/05; B36B 2035/448; B36B 2035/4486; B36B 2035/4433; B36B 2035/444
USPC .................................. 62/50.2, 50.1, 53.2
See application file for complete search history.

(56) References Cited

U.S. PATENT DOCUMENTS

| | | | |
|---|---|---|---|
| 4,522,159 A | 6/1985 | Engel et al. | |
| 5,370,159 A | 12/1994 | Price | |
| 5,457,951 A * | 10/1995 | Johnson | F01K 23/10 60/39.182 |
| 5,479,966 A | 1/1996 | Tison et al. | |
| 5,501,200 A | 3/1996 | Bogartz | |
| 5,584,664 A | 12/1996 | Elliott et al. | |
| 6,079,222 A * | 6/2000 | Fetescu | F01K 23/10 62/54.2 |
| 6,434,948 B1 * | 8/2002 | Eide et al. | 62/50.1 |
| 6,516,824 B2 * | 2/2003 | Yoshida et al. | 137/2 |
| 6,546,739 B2 * | 4/2003 | Frimm | B63B 27/24 62/240 |
| 6,655,155 B2 * | 12/2003 | Bishop | B63B 25/14 141/47 |
| 6,805,598 B2 | 10/2004 | Goldbach | |
| 6,932,326 B1 * | 8/2005 | Krabbendam | 254/334 |
| 7,299,760 B2 * | 11/2007 | Boatman | B63B 21/50 114/230.12 |
| 7,624,582 B2 * | 12/2009 | Hellesmark | B63B 27/24 114/264 |
| 2004/0011424 A1 * | 1/2004 | Dupont | B67D 9/00 141/279 |
| 2004/0045490 A1 * | 3/2004 | Goldbach | 114/257 |
| 2004/0261681 A1 | 12/2004 | Jordanger | |
| 2006/0118575 A1 | 6/2006 | Boyd et al. | |
| 2006/0243186 A1 * | 11/2006 | Park | 114/264 |
| 2007/0125122 A1 * | 6/2007 | Mak et al. | 62/620 |
| 2008/0096448 A1 * | 4/2008 | Lokken | B63B 22/021 441/4 |
| 2008/0190118 A1 * | 8/2008 | Lee | F17C 3/00 62/50.1 |
| 2008/0295526 A1 * | 12/2008 | Boatman | B63B 21/50 62/50.1 |
| 2008/0308175 A1 * | 12/2008 | Lee et al. | 141/11 |
| 2009/0133674 A1 * | 5/2009 | Lee et al. | 123/527 |
| 2009/0193780 A1 | 8/2009 | Faka | |
| 2009/0199575 A1 * | 8/2009 | Faka | 62/50.1 |
| 2009/0205363 A1 * | 8/2009 | de Strulle | B08B 7/0014 62/533 |
| 2009/0217676 A1 * | 9/2009 | Mak | 62/50.1 |
| 2009/0249799 A1 * | 10/2009 | Lee | F02C 7/143 62/50.3 |
| 2009/0266086 A1 * | 10/2009 | Lee et al. | 62/48.1 |
| 2009/0293506 A1 * | 12/2009 | Ryu | F17C 3/025 62/53.1 |
| 2010/0108190 A1 | 5/2010 | Baumer et al. | |

FOREIGN PATENT DOCUMENTS

| | | |
|---|---|---|
| DE | 102 01 273 A1 | 7/2003 |
| DE | 10 2006 047 313 A1 | 4/2008 |
| DE | 10 2009 028 109 A1 | 2/2011 |
| EP | 0 069 717 A1 | 1/1983 |
| EP | 1 227 971 A1 | 8/2002 |
| EP | 2 072 885 A1 | 6/2009 |
| EP | 2 228 294 A1 | 9/2010 |
| JP | 2006-348752 A | 12/2006 |
| KR | 10-0832603 | 5/2008 |
| KR | 10-2008-0097141 | 11/2008 |
| KR | 10-2003-0008743 | 1/2009 |
| KR | 10-2009-0057298 | 6/2009 |
| KR | 10-0967818 | 7/2010 |
| WO | 95/03218 A1 | 2/1995 |
| WO | 2005/068847 A1 | 7/2005 |
| WO | 2006/039485 A2 | 4/2006 |
| WO | 2006/052392 A2 | 5/2006 |
| WO | 2006/052896 A1 | 5/2006 |
| WO | 2008/031146 A1 | 3/2008 |
| WO | 2008-075882 | 6/2008 |
| WO | WO 2008/075882 * | 6/2008 ............. F17C 9/02 |

OTHER PUBLICATIONS

Germanischer Lloyd SE, "Rules for Classification and Construction, Ship Technology, Seagoing Ships, Liquified Gas Carriers", 2008, published by Germanischer Lloyd SE.
Wikipedia, "Gas compressor", Feb. 19, 2010.
Wikipedia, "Centrifugal compressor", Nov. 19, 2009.

* cited by examiner

FLOATING TYPE LNG STATION

CROSS-REFERENCE TO RELATED APPLICATIONS

This application is a U.S. National Stage of International Application No. PCT/KR2011/000985, filed Feb. 15, 2011 and published in Korean as WO/2011/105712 on Sep. 1, 2011. This application claims priority to Korean Application No. 10-2010-0016805, filed Feb. 24, 2010 and Korean Application No. 10-2010-0122104, filed Dec. 2, 2010. The disclosures of the above applications are incorporated herein by reference.

FIELD OF THE INVENTION

The present invention relates to a floating type LNG station capable of refueling a ship or a marine structure on the sea with LNG used as fuel.

BACKGROUND OF THE INVENTION

In general, natural gas is transported through gas pipelines of the land or sea in the form of gas, or is stored in an LNG carrier in the form of LNG (Liquefied Natural Gas, hereinafter, referred to as "LNG") to transport the stored LNG to required facilities in faraway places. Such LNG is obtained by cooling natural gas at an extremely low temperature of approximately −163 degrees Celsius, thereby being decreased to the extent of about 1/600 in volume compared to natural gas in the form of gas. Accordingly, LNG is very suitable for long-distance marine transport. The LNG carrier has an LNG storage tank which is able to withstand extremely low temperatures in order to load LNG and unload the LNG into required facilities on land after sailing the sea.

The following description will be given of a structure of an LNG storage tank in an LNG carrier in accordance with the prior art with reference to the accompanying drawings.

FIG. 1 is a sectional view illustrating an LNG carrier in accordance with the prior art. As shown in FIG. 1, a LNG carrier 1 of the prior art is provided with an LNG storage tank 2 therein. The LNG storage tank 2 is made of a structure and a material which are able to withstand extremely low temperatures, and is equipped with pipes and pumps, which are not shown, so as to supply and discharge LNG.

Such a conventional LNG carrier 1 stores LNG in the LNG storage tank 2 and then transports the LNG to required facilities on land.

Meanwhile, recently, ships utilizing LNG as fuel have been gradually increasing together with an increase in world oil prices. However, since LNG stations for such ships are limited to the land around harbors adjacent to several sea regions, the refueling of the ships is impossible during sailing. For this reason, the ships should move to the harbors for LNG refueling, thereby having time and space restraints.

Currently, ships or floating structures for solving these restraints have not been developed. Since the conventional LNG carrier 1 has only a function to simply transport LNG without an LNG refueling function, there is a problem in that, even in the case of being required to refuel the LNG carrier with LNG on the sea, it may not be solved. This is disclosed in, for example, U.S. Pat. No. 6,805,598 entitled "LIQUID NATURAL GAS TRANSFER STATION", issued on Oct. 19, 2004.

SUMMARY OF THE INVENTION

It is, therefore, an object of the present invention to provide a floating type LNG station capable of refueling a ship or a marine structure on the sea with LNG used as fuel.

Another object of the present invention is to provide a floating type LNG station capable of supplying LNG to a refueling target, processing boil-off gas during provision of LNG from an LNG supply ship, using the processed boil-off gas as fuel, or supplying electric power necessary for various utilities by utilizing the processed boil-off gas to produce motive power and electric power.

In accordance with an aspect of the present invention, there is provided a floating type LNG station which floats on the sea and refuels a refueling target requiring LNG with the LNG, including: a floating structure; an LNG tank which is provided in the floating structure so as to store the LNG; an LNG line for discharging the LNG from the LNG tank to the refueling target; and an LNG pump which is installed at the LNG line so as to provide pumping force for discharge of the LNG.

Preferably, the floating type LNG station further includes a multistage pressurizing pump which is installed at the LNG line so as to pressurize the LNG with any one of low pressure, intermediate pressure, and high pressure to correspond to a pressurized refueling condition of the refueling target and supply the pressurized LNG.

Preferably, the floating type LNG station further includes an unloading unit for transferring the LNG so that the LNG discharged from the LNG line is supply to the refueling target and for returning boil-off gas generated during transfer of the LNG.

Preferably, the floating type LNG station further includes equipment for temporarily storing boil-off gas generated during transfer of the LNG or for using the boil-off gas as fuel to produce electric power.

Preferably, the floating structure has at least one of a DP (Dynamic Positioning) device using satellite navigation and a self-mooring device.

Preferably, the floating structure has a water treatment device for preventing rocking due to a loading amount of LNG or sea conditions.

Preferably, the unloading unit further transfers the LNG so that the LNG is filled in the LNG tank through the LNG line.

Preferably, the LNG line is provided with a first bypass line for bypassing the pressurizing pump.

Preferably, the LNG line is provided with a second bypass line for bypassing the LNG pump and supplying the LNG to the LNG tank.

Preferably, the unloading unit further includes a boil-off gas line for loading and unloading the boil-off gas.

Preferably, the unloading unit further includes a boil-off gas processing device which is located in the floating structure and uses the LNG as fuel, and a supply line which branches from the boil-off gas line so as to supply the boil-off gas to the boil-off gas processing device.

Preferably, the unloading unit has a metering unit for detecting an unloading amount of LNG or a loading and unloading amount of LNG.

Preferably, the equipment includes: a separate boil-off gas processing line which is supplied with boil-off gas excessively generated from the LNG tank; a gas compressor which is coupled to the boil-off gas processing line and compresses the boil-off gas; a storage container which is connected to a rear end of the gas compressor and temporarily stores the compressed boil-off gas; and a control valve which is coupled to an extension line connected from a rear end of the storage container to a power production device and adjusts supply flow of the boil-off gas.

Preferably, the equipment further includes: a generator for producing the electric power using motive power generated by the power production device; and a voltage control unit which is coupled between an output end of the generator and an utility.

In accordance with the embodiments of the present invention, by refueling a ship or a marine structure on the sea with LNG used as fuel, the ship or the marine structure using LNG as fuel may be smoothly managed, and the ship or the marine structure may be no need to move to a harbor for LNG refueling, thereby enabling the minimization of time and space restraints.

Also, the embodiments of the present invention have an advantage of processing excessively generated boil-off gas to be used as fuel, and supplying electric power necessary for various utilities by utilizing the processed boil-off gas to produce motive power and electric power. Further, the embodiments of the present invention have an advantage of pressuring the excessively generated boil-off gas and temporarily storing the pressured gas in a compression container to be used as fuel again.

DETAILED DESCRIPTION OF THE EMBODIMENTS

Hereinafter, embodiments of the present invention will be described in detail with reference to the accompanying drawings so that they can be readily implemented by those skilled in the art. Further, detailed descriptions of constructions or functions well known in the art may be omitted to avoid obscuring appreciation of the disclosure by a person of ordinary skill in the art. Wherever possible, the same reference numbers will be used throughout the drawings to refer to the same or like parts.

Figure 1:
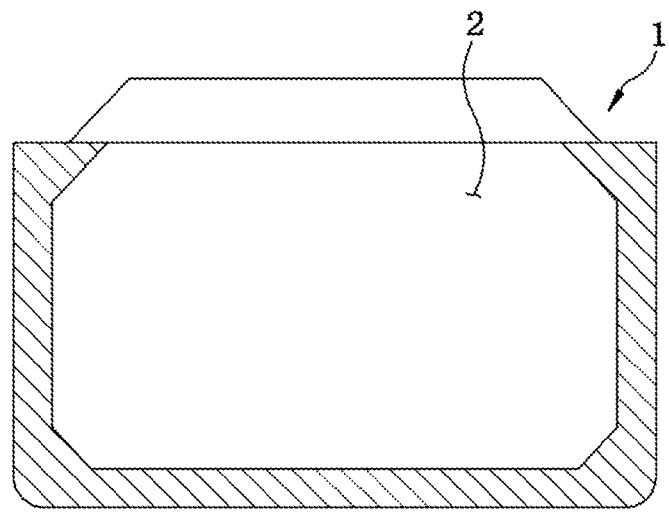
FIG. 1 is a sectional view illustrating an LNG carrier in accordance with the prior art.
Figure 2:
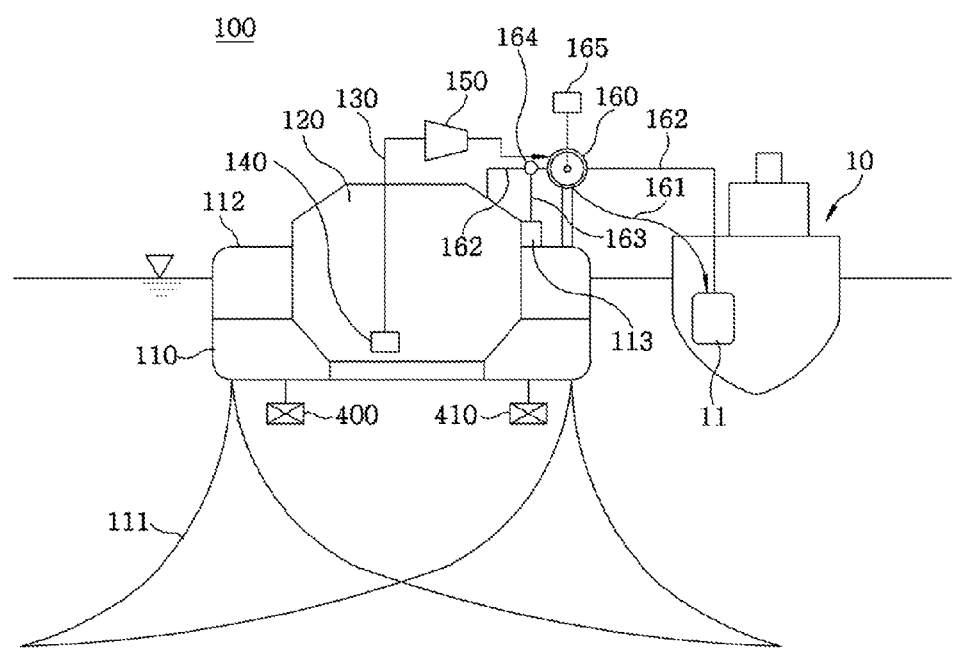
FIG. 2 is a diagram illustrating a configuration of a floating type LNG station in accordance with a first embodiment of the present invention, in which the floating type LNG station refuels a refueling target with LNG.
Figure 3:
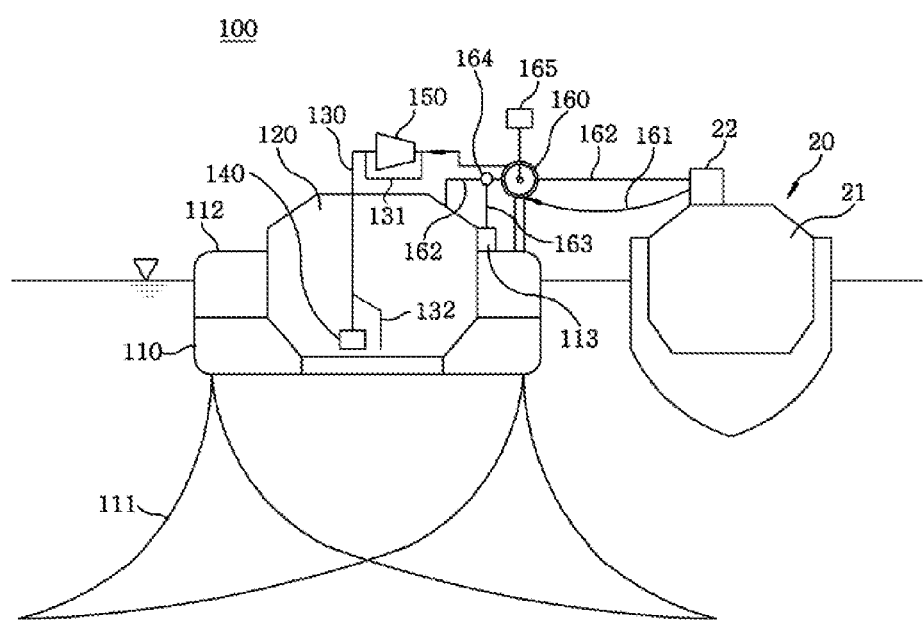
FIG. 3 is a diagram illustrating a configuration of a modification example of the floating type LNG station shown in FIG. 2, in which the floating type LNG station is supplied with LNG from an LNG supply ship.

FIG. 2 is a diagram illustrating a configuration of a floating type LNG station in accordance with a first embodiment of the present invention, and FIG. 3 is a diagram illustrating a configuration of a modification example of the floating type LNG station shown in FIG. 2. Particularly, FIG. 2 shows a manner in which the floating type LNG station of the present invention refuels a refueling target with LNG, and FIG. 3 shows a manner in which the floating type LNG station of the present invention is supplied with LNG from an LNG supply ship.

As shown in FIG. 2, a floating type LNG station 100 in accordance with the first embodiment is used to refuel a refueling target 10, such as a ship or a marine structure, with LNG (Liquefied Natural Gas) utilized as fuel for propulsion, electricity generation, or the like in a state of floating on the sea. The floating type LNG station 100 includes a floating structure 110, an LNG tank 120 provided in the floating structure 110, an LNG line 130 for discharging the LNG from the LNG tank 120, and an LNG pump 140 and a pressurizing pump 150 which are installed at the LNG line 130, and an unloading unit 160 for supplying the refueling target 10 such as the ship or the marine structure with the LNG discharged from the LNG line 130. Also, the floating type LNG station 100 may further include a facility which is able to process boil-off gas generated during loading and unloading the LNG, which will be discussed with reference to FIGS. 5 and 6.

The floating structure 110 may be equipped with a self-propelled system having a proper capacity in order to prepare for a marine disaster due to storms. Alternatively, the floating structure 110 may have a form of a barge moving by the help of a tug boat, or have various structures for floating on the sea. Also, the refueling target 10 may come alongside the floating structure 110 using the tug boat.

The floating structure 110 includes a self-mooring device 111 to be fixed at a position in which ships frequently come and go on the sea or at any other necessary position. Further, the floating structure 110 also includes a mooring function to accurately adjust a position by DP (Dynamic Positioning) devices 400 and 410 which are possible to automatically adjust the position through a propeller and a satellite apparatus or satellite navigation. That is, the floating structure 110 includes at least one of the self-mooring device 111 and the DP devices 400 and 410 by the satellite navigation.

In addition, the floating structure 110 includes a water treatment device 112, which has a plurality of ballast tanks, pumping devices, etc., to prevent the rocking of the floating structure due to a loading amount of LNG or sea conditions, and the ballast tanks is formed integrally with or independently of the LNG tank 120.

The LNG tank 120 is provided within the floating structure 110 for storing the LNG, and is configured as a membrane tank or in the form of an independent cargo hold of type B or type C, which is defined by the IMO (International Maritime Organization). Also, the LNG tank 120 may be arranged as a one-row or two-row structure, and provided with a delivery pump necessary for loading the LNG, a strip pump, a safety valve for controlling the pressure of the inside and outside, a temperature and pressure detection device, a gas detection device, and the like, in addition to the LNG pump 140.

The LNG line 130 is installed to provide a path for discharging the LNG from the LNG tank 120 or a path for supplying with the LNG from the LNG supply ship 20, and may be made of a structure and a material which are able to withstand extremely low temperatures.

The LNG pump 140 is installed to provide pumping force for discharge of the LNG to the LNG line 130, and a cryogenic pump may be used as the LNG pump in order to pump the LNG which is an extremely low temperature.

The pressurizing pump 150 is installed at the LNG line 130, and may pressurize LNG, which is supplied to a tank 11 of the refueling target 10 required for LNG refueling, with a predetermined pressure.

The unloading unit 160 supplies the LNG, which is discharged from the LNG line 130, to the tank 11 of the refueling target 10 through a refueling line 161. The refueling line 161 is switched to be supplied with the LNG from the LNG supply ship 20 and to fill the LNG tank 120 with the LNG through the LNG line 130, as shown in FIG. 3, in addition to unloading of the LNG, and thus loading and unloading may be possible. To achieve this, the refueling line 161 may include a flexible hose.

The unloading unit 160 may include a loading arm for transferring the refueling line 161 to the tank 11 of the refueling target 10 required for LNG refueling, and an IAS (Integrated Automation System) for managing overall operations related to loading or unloading and supply of LNG or BOG in a CACC (Centralized Administration Control Center), thereby enabling the performance of flow control, temperature control, and pressure control.

Meanwhile, the LNG line 130 may be provided with a first bypass line 131 to bypass the pressurizing pump 150 when being supplied with the LNG from the LNG supply ship 20, and a second bypass line 132 to supply the LNG tank 120 with the LNG by bypassing the LNG pump 140. In this case, one or more valves may be installed at any one or all of the LNG line 130 and the first and second bypass lines 131 and 132, thereby allowing the LNG supplied to the LNG tank 120 to bypass the pressurizing pump 150 and the LNG pump 140.

In addition, the unloading unit 160 not only allows the boil-off gas to be loaded into and unloaded from the refueling target 10 or the LNG refueling ship 20 located to be aligned in parallel with the floating structure 110, but also allows the boil-off gas to be loaded into and unloaded from the refueling target 10 or the LNG refueling ship 20 located to be aligned in series with the floating structure 110.

The unloading unit 160 further includes a boil-off gas line 162 to load and unload the boil-off gas, for example, to unload the boil-off gas, which is generated from the LNG tank 120, into the LNG supply ship 20 or to return the boil-off gas, which is generated from the tank 11 of the refueling target 10, to the LNG tank 120. The boil-off gas line 162 returns the boil-off gas, which is generated from the tank 11 of the refueling target 10 during delivery of the LNG from the LNG tank 120 to the refueling target 10, to the LNG tank 120, thereby serving to compensate an increase in pressure within the tank 11 of the refueling target 10 due to generation of the boil-off gas.

Specifically, the boil-off gas line 162 serves to compensate mutual pressure between the LNG tank 120 and the tank 11 of the refueling target 10. That is, since boil-off gas is considerably filled at first in the tank 11 of the refueling target 10 to be supplied with the LNG from the LNG tank 120, it is necessary to appropriately return the boil-off gas, which is generated when the LNG is unloaded from the LNG tank 120 to the tank 11 of the refueling target 10, to the LNG tank 120.

If the boil-off gas is not extracted from the tank 11 of the refueling target 10, pressure in the tank 11 of the refueling target 10 having constant volume is rapidly increased, thereby causing problems in terms of stability of the tank 11 and unloading of the LNG. However, an increase in pressure due to the boil-off gas may be compensated by unloading or returning the boil-off gas through the boil-off gas line 162.

The boil-off gas line 162 may also serve to compensate mutual volume between the LNG tank 120 and the tank 11 of the refueling target 10. That is, the boil-off gas line 162 may also perform a role to compensate the volume between the LNG tank 120 and the tank 11 of the refueling target 10, namely, a role to exchange the mutual volume therebetween, by return of the boil-off gas having the same volume as the LNG, which is transferred from the LNG tank 120 to tank 11 of the refueling target 10, from the tank 11 of the refueling target 10 to the LNG tank 120. Such a boil-off gas line 162 may include a flexible hose.

Here, the transferred boil-off gas may be utilized as separate fuel. To achieve this, the unloading unit 160 further includes a supply line 163 branching from the boil-off gas line 162 so as to supply the boil-off gas to a boil-off gas processing device 113 using the boil-off gas as fuel. Accordingly, the boil-off gas transferred along the boil-off gas line 162 is supplied to the boil-off gas processing device 113 through the supply line 163. Also, a change valve 164 to bypass the boil-off gas processing device 113 may be installed at any one or all of the boil-off gas line 162 and the supply line 163. Here, the change valve 164 may be implemented as a plurality of bi-directional valves, in addition to a three-way valve shown in the present embodiment.

The boil-off gas processing device 113 may be, for example, at least one of a boiler, an incinerator, a power plant or a generator for producing electricity, and a fuel engine. The following description will be given of examples of the specific use in the boil-off gas processing device 113 with reference to FIGS. 5 and 6.

The unloading unit 160 further includes a metering unit 165 to detect an unloading amount of LNG or a loading and unloading amount of LNG. By the metering unit 165, it is possible to easily identify an amount of LNG unloaded from the LNG tank 120 or an amount of LNG filled in the LNG tank 120 from the outside.

Figure 4:
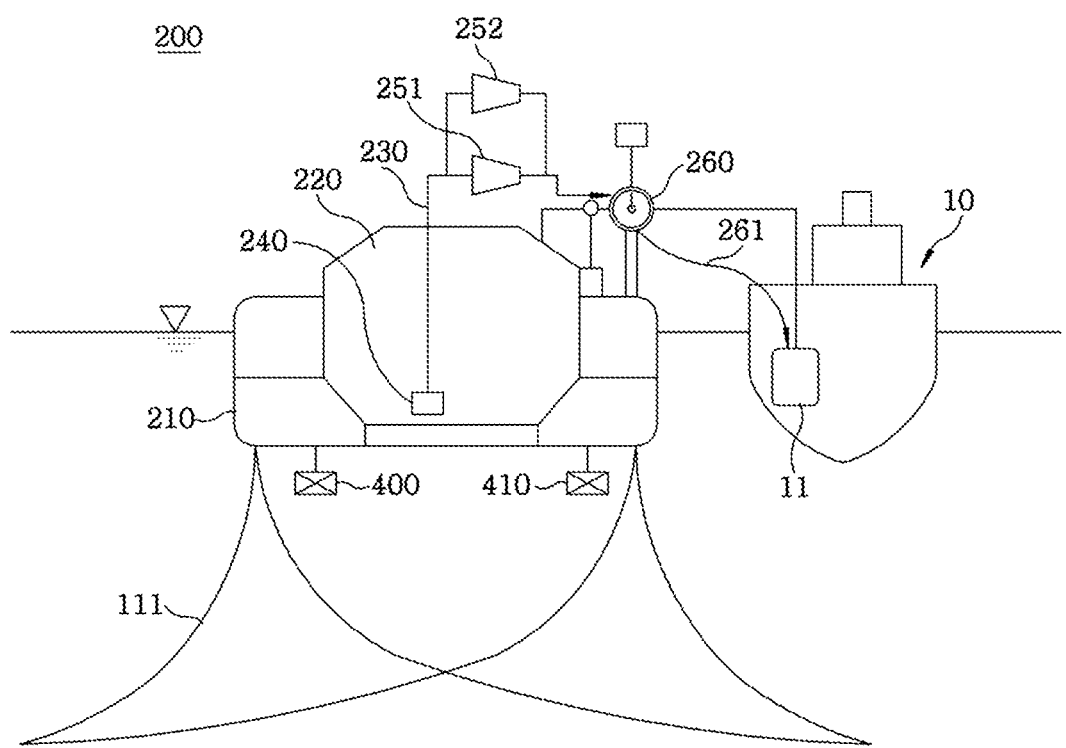
FIG. 4 is a diagram illustrating a configuration of a floating type LNG station in accordance with a second embodiment of the present invention.

FIG. 4 is a diagram illustrating a configuration of a floating type LNG station in accordance with a second embodiment of the present invention.

As shown in FIG. 4, a floating type LNG station, 200 in accordance with the second embodiment includes a floating structure 210, an LNG tank 220 provided in the floating structure 110 so as to store LNG, an LNG line 230 for discharging the LNG from the LNG tank 220, and an LNG pump 240 which is installed at the LNG line 230 so as to provide pumping force for discharge of the LNG, pressurizing pump 251 and 252 which are installed at the LNG line 230 so as to pressurize the LNG, and an unloading unit 260 for supplying a ship or a marine structure with the LNG discharged from the LNG line 230. The above-mentioned components are substantially similar to those of the floating type LNG station 100 in accordance with the first embodiment, and therefore, no description will be given thereof.

In the present embodiment, particularly, the pressurizing pumps 251, 252 may be comprised of a plurality of pressurizing pumps having pressurized pressure of the LNG different from one another, or be comprised of a multistage pressurizing pump, thereby being able to be selectively used depending on delivery pressure of the LNG. For example, the pressurizing pumps may be comprised of a high pressure pressurizing pump 251 to pressurize the LNG with high pressure and an intermediate and low pressure pressurizing pump 252 to pressurize the LNG with intermediate pressure or with low pressure, as illustrated in the present embodiment.

The high pressure pressurizing pump 251 and the intermediate and low pressure pressurizing pump 252 may be selectively used depending on the pressurized pressure of the LNG determined within a proper range which satisfies a pressure condition, namely, a refueling pressure condition required for supply of the LNG to the refueling target 10, such as the ship using the LNG as fuel for propulsion, electricity generation, or the like, or the marine structure having equipment driven using the LNG as fuel. The pressurizing pumps 251 and 252 may not also be used in a case of being able to supply the LNG only by the delivery pressure of the LNG. Although two pressurizing pumps are used to be configured as two stages in the present embodiment, if necessary, the pressurizing pump may be configured as three or more in number or a plurality of pressurizing pumps may also be disposed in parallel.

In addition, each pressurizing pump 251 or 252, which may be manufactured as a multistage structure which disposes module pressurizing pumps in series, may also be used in the present embodiment.

Each pressurizing pump 251 or 252 may be manufactured so as to pressurize the LNG with low pressure, with intermediate pressure, or with high pressure to correspond to the refueling pressure condition of the refueling target and then supply the pressurized LNG, and may be installed at the LNG line 230.

Figure 5:
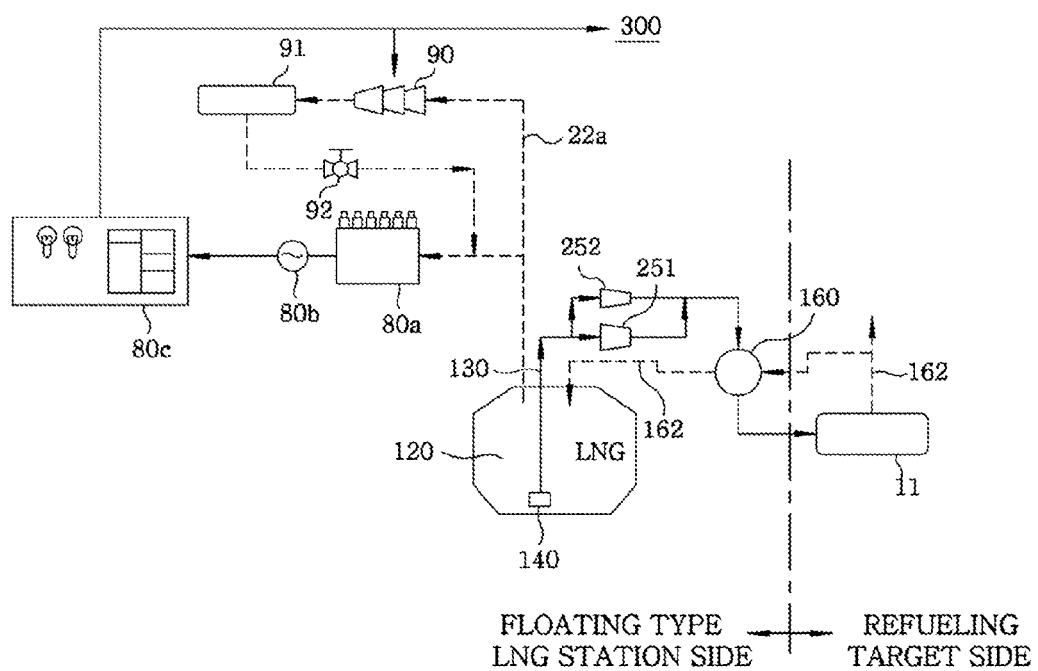
FIG. 5 is a diagram illustrating a process of boil-off gas which is generated when supplying LNG from a floating type LNG station to a refueling target.
Figure 6:
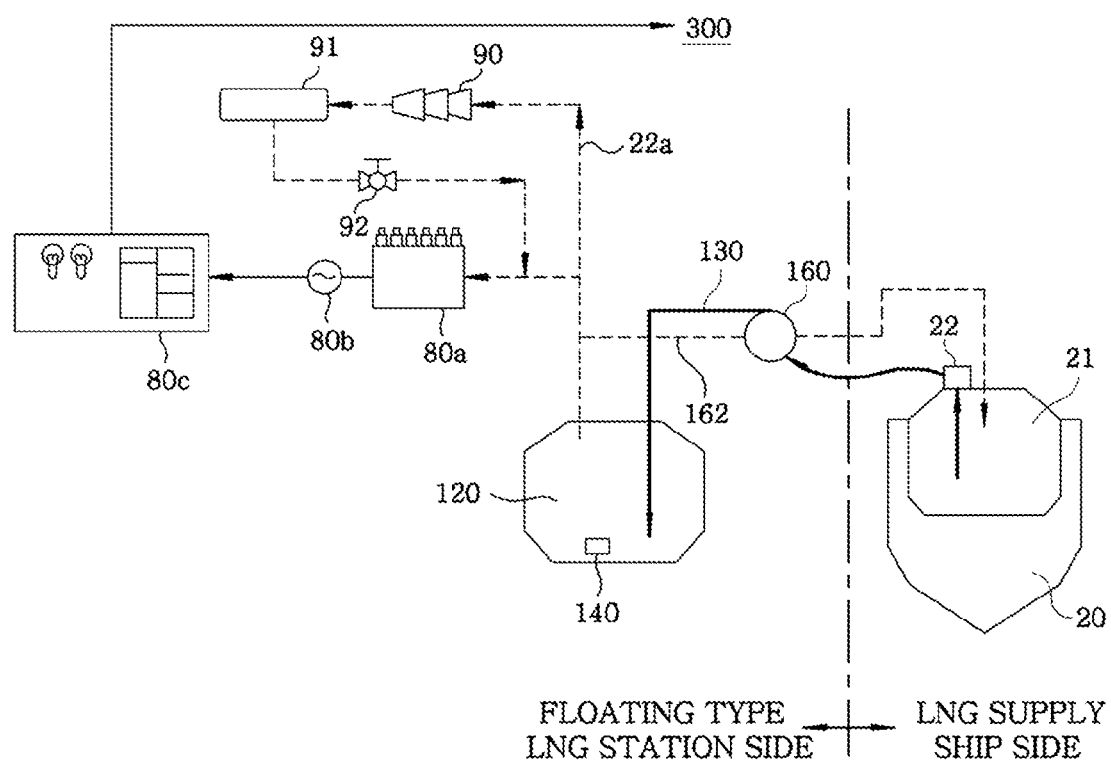
FIG. 6 is a diagram illustrating a process of boil-off gas which is generated when being supplied with LNG from an LNG supply ship to a floating type LNG station.

FIG. 5 is a diagram illustrating a process of the boil-off gas which is generated when supplying the LNG from the floating type LNG station to the refueling target, and FIG. 6 is a diagram illustrating a process of the boil-off gas which is generated when being supplied with the LNG from the LNG supply ship to the floating type LNG station.

Referring to FIGS. 5 and 6, all of the boil-off gas, which are generated during LNG transfer between the floating type LNG station and the refueling target or between the floating type LNG station and the LNG supply ship, may be used to produce electric power required for operation of equipment and driving of utilities 300 in the floating type LNG station.

For example, the utilities 300 may be compressive devices, pumps, lights, air conditioning equipment, controllers, or various electric devices, but the utilities 300 are not limited thereto.

The boil-off gas, which is excessively created from the LNG tank 120, when the LNG is supplied to the refueling target as shown in FIG. 5 or when the LNG is supplied from the LNG supply ship 20 as shown in FIG. 6, passes a gas compressor 90, which is able to compress the boil-off gas with necessary pressure, through a separate boil-off gas processing line 22*a*.

Here, the boil-off gas processing line 22*a* may be configured to supply electric power required for the utilities and to supply the boil-off gas, which is supplied from the LNG tank 120, to the gas compressor 90 or a power production device 80*a*, by processing the boil-off gas to be used as fuel and utilizing the same to produce motive power and electric power. The power production device 80*a* may be a diesel engine, a dual fuel diesel engine, a gas turbine device, a steam boiler, a steam turbine device, or the like. Also, the gas compressor 90 may be connected, at a rear end thereof, with a storage container 91 to temporarily store the compressed boil-off gas, and the storage container 91 may serve as a buffer during supply of the boil-off gas. The storage container 91 may have a variety of forms such as a pressure container or a buffer tank.

Furthermore, a control valve 92 may be coupled to an extension line connected from the rear end of the storage container 91 to the power production device 80*a* so as to adjust supply flow of the boil-off gas.

Accordingly, the boil-off gas may pass the gas compressor 90, be temporarily stored in the separate storage container 91, and be then transferred to the power production device 80*a* so as to be burned, or may be directly transferred from the LNG 120 to the power production device 80*a* without passing the gas compressor 90 or the storage container 81 so as to be burned.

Here, a generator 80*b* to produce electric power using motive power generated by the power production device 80*a* may be coupled to an output end of the power production device 80*a*. Also, the generator 80*b* may be electrically coupled, at an output end thereof, with a voltage control unit 80*c* (for example, switch board) which changes generated power into electric power to be used in the utilities and manages the same.

Thus, the generator 80*b* may produce electric power using motive power generated by the power production device 80*a*, and the produced electric power may be supplied to each of the utilities 300, which require the electric power, through the voltage control unit 80*c*.

Meanwhile, in a separate incident, the boil-off gas, which is naturally generated from the LNG cargo hold 120 by heat merely input from the outside regardless of LNG transfer between the floating type LNG station and the refueling target 10 or between the floating type LNG station and the LNG supply ship 20, may be similarly supplied as fuel through the boil-off gas processing line 22*a* and the associated coupling configurations. Moreover, referring to FIG. 6, even in a case of being supplied with the LNG from the LNG supply ship 20 to the LNG tank 120, similarly, the boil-off gas in the LNG tank 120 may be returned to the LNG supply ship 20 via the boil-off gas line 162 and the unloading unit 160. Since this is similar to a case of transferring the LNG from the LNG tank 120 to the tank 11 of the refueling target 10, no specific description will be given thereof.

The following description will be given of an operation of the floating type LNG station having the above-mentioned configurations in accordance with the present invention, for example.

As shown in FIG. 2 and FIG. 4, in a state of being fixed so that the floating structure 110 or 210 floats on the sea by the self-mooring device 111, the refueling line 161 or 261 is connected to the refueling target 10 coming alongside the floating structure 110 or 210, for example, the tank 11 provided in the ship or marine structure which requires LNG refueling by the unloading unit 160 or 260. Next, the LNG in the LNG tank 110 is supplied to the tank 11 of the refueling target 10 through the LNG line 130 or 230 and the refueling line 161 or 261 by pumping of the LNG pump 140 or 240.

In this case, as occasion demands, the LNG may be compressed with proper pressure by the pump 150 shown in FIG. 2 and be supplied, or may be compressed by the plural compressors or the multistage compressors 251 and 252 shown in FIGS. 4 and 5 depending on the compressive extent or the compressive refueling condition and be supplied.

As shown in FIGS. 3 and 6, when it is necessary to supply the LNG to the LNG tank 120 of the floating structure 110, the LNG is supplied from the LNG tank 21 of the LNG supply ship 20 through the manifold 22 of the LNG supply ship 20 to the LNG tank 120 of the floating structure 110 through the refueling line 161 and the LNG line 130, using the unloading unit 160.

In this case, as shown in FIG. 3, the LNG, which is supplied to the LNG tank 120 of the floating structure 110, may bypass the pump 150 and the LNG pump 140 through the first and second bypass lines 131 and 132.

Meanwhile, when the unloading unit 160 loads and unloads the LNG as described above, the boil-off gas, which is generated from the tank 11 of the refueling target 10, may be returned to the LNG tank 120 of the floating structure 110 by the boil-off gas line 162, or the boil-off gas, which is generated from the LNG tank 120 of the floating structure 110, may be returned to the LNG tank 21 of the LNG supply ship 20 by the boil-off gas line 162.

As a result, the boil-off gas line 162 may serve to compensate the mutual pressure between the LNG tank 120 and the tank 11 of the refueling target 10, and may also serve to compensate the mutual volume therebetween.

That is, the initial boil-off gas is considerably filled in the tank 11 of the refueling target 10 which is supplied with the LNG from the LNG tank 120, and thus the mutual pressure and volume may be compensated by appropriately returning the same boil-off gas as the unloading amount of LNG, which is generated when the LNG is unloaded from the LNG tank 120 to the tank 11 of the refueling target 10, to the LNG tank 120.

In this process, the boil-off gas in the boil-off gas line 162 is supplied to the boil-off gas processing device 113 of the floating structure by change of the change valve 164, thereby being able to be used as fuel for producing electric power as illustrated in FIG. 5 or FIG. 6.

While the invention has been shown and described with respect to the preferred embodiments, it will be understood by those skilled in the art that various changes and modifications may be made without departing from the scope of the invention as defined in the following claims.

What is claimed is:

1. A floating type Liquefied Natural Gas (LNG) station which floats on water and refuels a refueling target requiring LNG with LNG, comprising:
    a floating structure;
    an LNG tank which is provided to the floating structure so as to store the LNG;
    an LNG line connecting the LNG tank and the refueling target for discharging the LNG from the LNG tank to the refueling target;
    an LNG pump which is installed at the LNG line so as to provide a pumping force for discharge of the LNG;
    an unloading unit for transferring the LNG so that the LNG discharged from the LNG line is supplied to the refueling target and for returning boil-off gas generated during transfer of the LNG;
    a multistage pressurizing pump installed at the LNG line between the LNG pump and the unloading unit on the LNG station, the multistage pressurizing pump selectively increasing a pressure of the LNG transferred by the LNG pump;
    a temperature and pressure detector sensing a temperature and a pressure of the refueling target; and
    a controller determining whether a refueling pressure corresponds to a pressure condition of the refueling target based on the sensed temperature and pressure of the refueling target and controlling the multistage pressurizing pump based on the determination,
    wherein the multistage pressurizing pump increases the pressure of the LNG in the LNG line so that the refueling pressure corresponds to the pressure condition of the refueling target, so as to supply the LNG to the refueling target,
    wherein the unloading unit includes a boil-off gas line for loading and unloading the boil-off gas, a boil-off gas processing device which is located in the floating structure and uses the LNG as fuel, and a supply line which branches from the boil-off gas line so as to supply the boil-off gas to the boil-off gas processing device,
    wherein the refueling target comes alongside the LNG station from outside the LNG station, and
    wherein the boil-off gas line is detachably connected to the refueling target.

2. The floating type LNG station of claim 1, further comprising equipment for temporarily storing boil-off gas generated during transfer of the LNG or for using the boil-off gas as fuel to produce electric power.

3. The floating type LNG station of claim 1, wherein the floating structure has at least one of a Dynamic Positioning (DP) device using satellite navigation and a self-mooring device.

4. The floating type LNG station of claim 1, wherein the floating structure has a water treatment device for preventing rocking due to a loading amount of LNG or sea conditions.

5. The floating type LNG station of claim 1, wherein the unloading unit further transfers the LNG so that the LNG is filled in the LNG tank through the LNG line.

6. The floating type LNG station of claim 5, wherein the LNG line is provided with a bypass line for bypassing the multistage pressurizing pump.

7. The floating type LNG station of claim 5, wherein the LNG line is provided with a bypass line for bypassing the LNG pump and supplying the LNG to the LNG tank.

8. The floating type LNG station of claim 1, wherein the unloading unit has a metering unit for detecting an unloading amount of LNG or a loading and unloading amount of LNG.

9. The floating type LNG station of claim 2, wherein the equipment includes:
    a separate boil-off gas processing line which is supplied with boil-off gas excessively generated from the LNG tank;
    a gas compressor which is coupled to the boil-off gas processing line and compresses the boil-off gas;
    a storage container which is connected to a rear end of the gas compressor and temporarily stores the compressed boil-off gas; and
    a control valve which is coupled to an extension line connected from a rear end of the storage container to a power production device and adjusts supply flow of the boil-off gas.

10. The floating type LNG station of claim 9, wherein the equipment further includes:
    a generator for producing the electric power using motive power generated by the power production device; and
    a voltage control unit which is coupled between an output end of the generator and a utility.

11. The floating type LNG station of claim 3, wherein the floating structure has a water treatment device for preventing rocking due to a loading amount of LNG or sea conditions.

12. The floating type LNG station of claim 6, wherein the LNG line is provided with a second bypass line for bypassing the LNG pump and supplying the LNG to the LNG tank.

13. The floating type LNG station of claim 5, wherein the unloading unit has a metering unit for detecting an unloading amount of LNG or a loading and unloading amount of LNG.

14. The floating type LNG station of claim 1, wherein the multistage pressurizing pump is configured to pressurize the LNG with any one of low pressure, intermediate pressure, and high pressure to correspond to a refueling pressure condition of the refueling target and to supply the pressurized LNG.

\* \* \* \* \*